Patented July 28, 1931

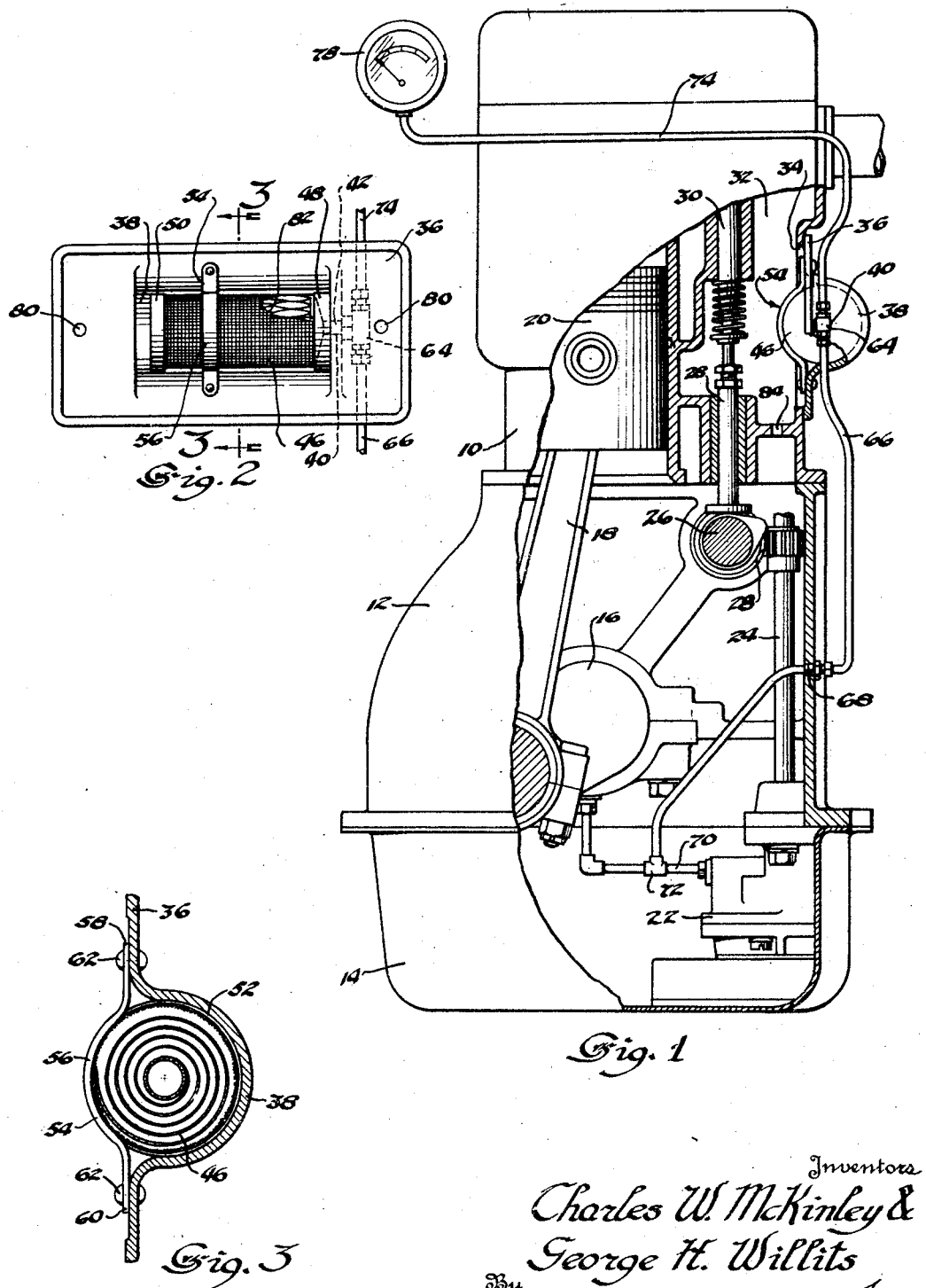

1,816,600

UNITED STATES PATENT OFFICE

CHARLES W. McKINLEY, OF FLINT, AND GEORGE H. WILLITS, OF PLEASANT RIDGE, MICHIGAN, ASSIGNORS TO A C SPARK PLUG COMPANY, OF FLINT, MICHIGAN, A COMPANY OF MICHIGAN

OIL FILTER MOUNTING

Application filed April 30, 1928. Serial No. 274,028.

This invention relates to lubricating systems used on power plants, and has particular reference to a lubricating system applied to internal combustion engines used on automotive vehicles, and to the mounting of the lubricant purifier or oil filter.

The present type of lubricating systems used in connection with automotive vehicles is usually of the force feed type, in which a pump is used to force the flow of oil to the various bearings parts. Positioned in the path of the oil at any suitable point is an oil filter or lubricant purifier which is usually adapted to receive but a portion of the oil discharged by the pump. This oil filter has been placed at the dashboard, or mounted at some part of the internal combustion engine, and usually comprises a filtering material housed within a metal container. The placing of the oil filter at the dash, or outside the crankcase, necessitates an outer container for the filtering material, and also a considerable amount of piping to conduct the oil to and from the filter. This piping is objectionable and obstructs the way for the application of auxiliaries such as a fuel pump; and is also an inconvenience when it is desired to work on the engine as the pipes are liable to become damaged or broken.

The object of the present invention is to eliminate the outer container as well as a large part of the piping, and to mount the filter where it is out of the way. We accordingly mount the oil filter within the engine block and provide a suitable covering to protect the filter or purifier from outside exposure. The usual filter can or container is eliminated and the filtering material, without the can, is attached to a suitable removable part of the engine block, and the filtered oil allowed to drip directly from the filtering material to the engine block.

In practice, we prefer to utilize the plate or closure for the valve chamber opening and suitably adapt it for mounting the filtering unit or material. We accordingly provide a recessed hollow or bulged portion on the valve chamber closure, this recessed portion being of any suitable depth and shaped so that it fits the filter, although this special shaping is not necessary. The filtering material is secured to the valve chamber cover by means of a strap, the body portion of which embraces the filtering material, while the ends thereof are secured in a suitable way to the plate or cover.

The end portion of the recess is provided with an opening for the reception of the filter inlet, and at this inlet there is connected the pipe which conducts a portion of the oil from the pump. At the inlet there is also provided a second pipe which leads to a gage mounted at a suitable point.

As a modification of the invention, we may provide a separate shell or container adapted to be mounted at any part of the crankcase, oil pan or engine block, but preferably a flattened portion. In this container the filtering unit is mounted, and the oil pan, engine block or crankcase has an opening to permit the flow of oil back to the oil pan. In this species, in order to replace the filtering unit, it will be necessary to remove the shell, which will permit access to and removal of the filtering medium. A new filtering material may then be inserted and the shell reapplied to the crankcase.

In the drawings:

Figure 1 shows an internal combustion engine with parts broken away and shown in section to illustrate the application of the invention thereto.

Figure 2 is a rear view of the plate or cover for closing the valve chamber opening, the filter being shown attached thereto.

Figure 3 is an enlarged sectional view taken substantially on the line 3—3 of Figure 2.

Figure 4:
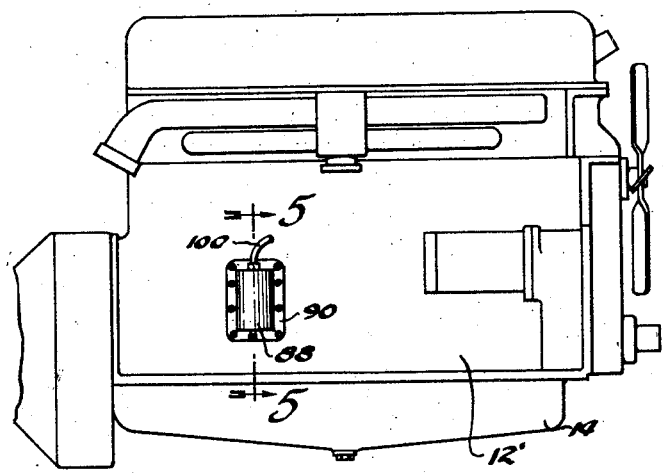
Figure 4 is a side view of an internal combustion engine showing a modified form of the invention.

Referring to the species shown in Figures 1 and 3, the numeral 10 indicates the cylinder block of a multi-cylinder internal combustion engine, 12 the crankcase and 14 the oil pan. A crankshaft is shown at 16, one of the piston rods at 18, while 20 denotes one of the pistons. The usual oil pump is designated by 22, which pump is driven by a shaft 24 connected to the camshaft 26 through the intermediary of a suitable gearing 28. From the camshaft 26 are operated the usual valve tappets 28, which in turn operate the valve stems 30 in the valve chamber 32.

The valve chamber 32 is open at its side as shown at 34, and a plate or closure 36 is applied over this opening to prevent the ingress of dirt and foreign matter. If desired, a gasket may be applied between the plate 36 and the cylinder block 10 to form a fluid-tight connection.

The plate or closure 36 is bulged or hollow, or formed with a recessed portion 38 which may be of any suitable shape, but is preferably cylindrical. This recess 38 may extend away from the engine any suitable distance, the only limitation being that when the filter 46 is mounted therein sufficient clearance is left between the filter and the working parts or valve tappets. The end portion of the bulge or recessed portion 38 is provided with an opening at 40, which opening is adapted to receive the inlet stud 42 attached to the filtering unit 46. This filtering unit 46 has the end reinforcing portions 48 and 50 which project slightly beyond the screen 82 so as to leave a space 52 between the filtering unit 46 and the recessed or bulged portion 38. The purpose of this space is to allow for the ready flow of filtered oil away from the plate 36.

While we have shown the recessed portion 38 as formed integral with the plate 36, it is nevertheless within the scope of the invention to form it separately and later rigidly secure it over an opening in the plate.

The filtering unit 46 is retained on the inside of the plate 36 by means of the strap 54, which has its body portion 56 embracing the filter, and its flanged ends 58 and 60 secured to the plate or closure 36 by means of the bolts or rivets 62.

Secured to the inlet 42 of the filter, outside the opening 40 and the end of the recessed portion 38, is a T-connection 64. The lower end of this T is connected with a pipe 66 which passes through the crankcase as at 68, and is connected to the delivery pipe 70 of the pump 22 by means of the T-connection 72. The opposite end of the T-connection 64 has joined thereon a pipe 74, which leads to a gage 78 which will show an increase in pressure when the filter becomes clogged.

The plate 36 is secured to the engine crankcase in any suitable way, such as by means of bolts passing through the openings 80, the engine block, of course, having openings therein corresponding to the openings 80.

From an inspection of Figure 1, it will be apparent that by the use of the present invention we have eliminated the outer metallic container for the oil filter, done away with the usual piping interconnected with the filter, placed the filter where it is out of the way, and have enabled the filter to be applied to the engine as a unit with the usual plate or cover which forms the closure for the valve chamber opening.

In order to permit of the ready attachment and detachment of the cover, we may use a union to form the connection between the inlet stud 42 of the filter and T-connection 64.

The contaminated oil after passing through the filter will flow from the screen 82 surrounding the filtering material and drop over into the valve chamber 32, where it will flow into the passage 84 and return to the oil pan 14.

With the installation of the present invention, the excess piping which is used when the filter is applied to the dashboard is done away with, and there is accordingly less danger of a breaking of the piping system. The engine is also more accessible, and the auxiliaries such as a fuel pump, etc. are more readily installed.

Figures 5, 6:
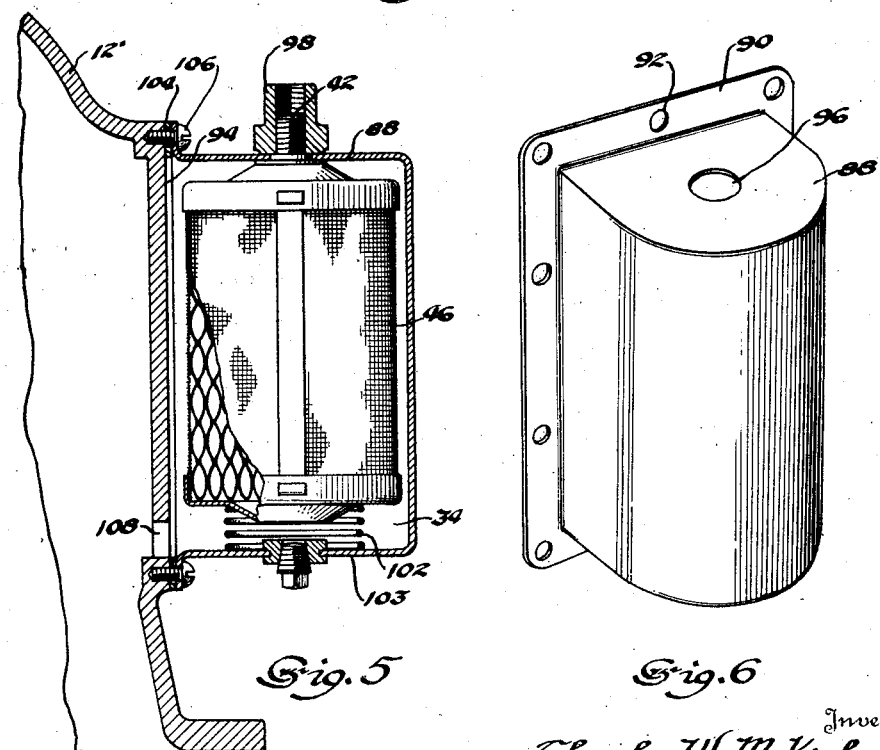
Figure 5 is a section taken substantially on the line 5—5 of Figure 4.
Figure 6 is a perspective view of the shell or housing for the oil filtering material shown in Figures 4 and 5.

Referring to the species shown in Figures 4, 5 and 6, it will be seen that, instead of attaching the filtering unit 46 to the closure for the valve chamber opening, we make use of a separate and independent shell or closure 88 having a flanged portion 90, provided with a plurality of openings 92, to permit it to be attached to a flat portion 94 of the crankcase 12'.

While we have shown the shell 88 as having an attaching surface in a single plane to adapt it to a flat portion of the crankcase, it is neverthless within the scope of the invention to shape the shell 88 so that it may fit any suitable portion of the crankcase or engine block.

Positioned within the shell 88 is the filtering unit 46, which has its inlet stud 42 passing through an opening 96 in the end of the shell 88. Secured over the stud 42 is a nut 98 in which there is threaded a pipe 100 coming from the oil pump, or from a suitable metering means which supplies oil to the filter. In order to facilitate the disconnecting of the pipe 100, a union may be applied at the inlet 42 to form the connection with the pipe 100.

Positioned in the bottom of the shell 88 is a spring 102, which holds the filtering unit 46 away from the bottom 103, serves as an additional means for its mounting, and allows for the removal of the unit.

A gasket 104 is provided between the shell portion 88 and the flat portion 94 of the crankcase, and screws 106 are pressed through the openings 92 and corresponding openings in the crankcase to hold the shell 88 and the filtering unit 46 in rigid relation with reference to the engine.

The flat portion 94 is provided with an opening 108, at its bottom portion, to allow for the return of the filtered oil to the oil pan 14 after it has passed through the filter.

After the filtering unit 46 becomes clogged, or if it is desired to replace the filtering material, all that is necessary is to remove the screws 106, disconnect the piping 100, when the shell 88 may be taken away from the crankcase. The filtering unit may now be removed due to the play allowed by the spring 102, a new filtering unit placed in the shell 88, and the shell then reattached to the flat portion 94 of the crankcase.

This species of the invention also results in an elimination of the usual piping which is incident to the mounting of the oil filter in the dashboard, or at the end of the engine block. The invention also makes for a compact construction, and cheapens the cost due to the fact that each time the filter is replaced it is not necessary to replace the container, the shell 88 being reused each time the filter is changed.

We claim:

1. In combination with an internal combustion engine having a lubricating system, a plate fitting over and closing the valve chamber opening in the side of the engine block, an outwardly directed recessed or bulged portion on said plate, a lubricant purifier fitting within said recessed portion, a strap for holding the purifier having its body portion embracing said purifier and its ends secured to said plate, and means in said engine block to permit the lubricant to return to the engine oil pan.

2. In combination with an internal combustion engine having a lubricating system and a valve chamber, said engine having an opening exposing the valve mechanism in the valve chamber, a closure for said opening, and an oil filter in said lubricating system secured on the inside of said closure.

3. In combination with an internal combustion engine having a lubricating system and an opening exposing some of its working parts, a plate for closing said opening, a recess in said plate, and an oil filter in said lubricating system and mounted in said recess on the inside of said plate.

4. In combination with an internal combustion engine having a lubricating system and a lateral opening exposing its valve chamber, a plate for closing said opening, a recess in said plate extending laterally of and away from the engine, and an oil filter in said lubricating system and secured in said recess.

5. In combination with an engine having a lubricating system, an oil pan, and a lateral opening exposing its valve chamber, a plate for covering said opening, an oil filter in said system secured to the inside of said plate and delivering its oil to the valve chamber, and means to allow the filtered oil to flow from the valve chamber to the oil pan.

6. In combination with an engine having a lubricating system, an oil pan, and a lateral opening exposing its valve chamber, a plate for covering said opening, an oil filter in said system secured to the inside of said plate and delivering its oil to the valve chamber, said engine having an opening to allow the filtered oil to flow from the valve chamber to the oil pan.

7. In combination with an engine having a lubricating system and an opening exposing its valve chamber, a plate for closing said opening, a recess in said plate, an oil filter in said system, and a strap for securing said filter in said recess.

8. In combination with an engine having a lubricating system and an opening exposing its valve chamber, a plate for closing said opening, a recess in said plate, an oil filter in said system, and a strap having its body portion adapted to fit said filter and its ends secured to said plate for securing said filter in said recess.

In testimony whereof we affix our signatures.

CHARLES W. McKINLEY.
GEORGE H. WILLITS.